(No Model.)
A. DAVID.
GRAPE STEMMER AND CRUSHER.
No. 320,049. Patented June 16, 1885.
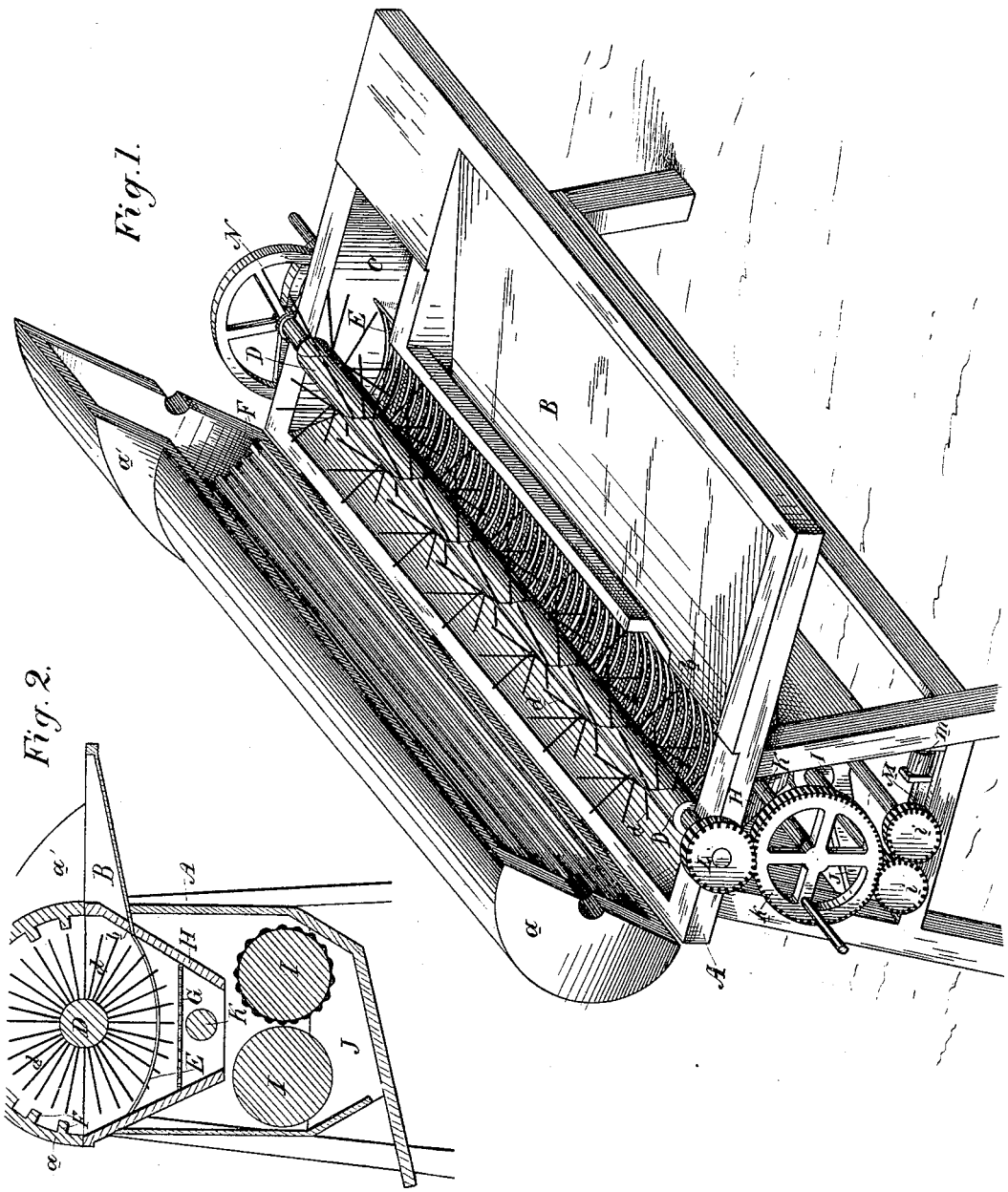
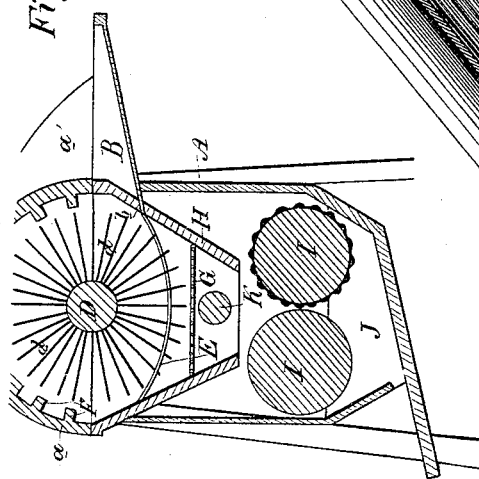
Witnesses,
Geo. H. Strong.
J. H. Rouse.
Inventor,
A. David
By
Dewey & Co.
Attorneys

United States Patent Office.

AUGUSTE DAVID, OF SAN FRANCISCO, CALIFORNIA.

GRAPE STEMMER AND CRUSHER.

SPECIFICATION forming part of Letters Patent No. 320,049, dated June 16, 1885.

Application filed April 27, 1885. (No model.)

*To all whom it may concern:*

Be it known that I, AUGUSTE DAVID, of the city and county of San Francisco, and State of California, have invented an Improvement in Grape Stemmers and Crushers; and I hereby declare the following to be a full, clear, and exact description thereof.

My invention relates to that class of machines the object of which is to remove the stems from the grapes and subsequently to crush the grapes, and which are commonly known as "grape stemmers and crushers."

My invention consists in a casing or shell, in which is mounted a rotating shaft carrying a series of spirally-arranged arms, a hopper adapted to feed the bunches of grapes to the arms, an underlying laterally-concaved grating through which the grapes pass, a series of parallel spaced bars on the under surface of the swinging cover of the casing against which the arms beat the stems, a horizontal screen under the grating, a chute under the screen, and suitable crushing-rolls under the chute.

It consists, further, in details of construction relating to the points of feeding and discharge, all of which I shall hereinafter fully explain.

The object of my invention is to provide a simple, effective, and easily-operating grape stemmer and crusher.

Referring to the accompanying drawings, Figure 1 is a perspective view of my machine, the cover being raised. Fig. 2 is a vertical cross-section of same.

A is the main casing or shell, having a semi-cylindrical hinged cover, $a$.

B is the feed-hopper consisting of a shallow basin having a feed-aperture, $b$, at one end of its back and in communication with the interior of the casing near its end. At the other end of the casing is formed a discharge-chute, C, for the stems, which is covered by an extension, $a'$, on the end of the cover.

Mounted longitudinally in the casing is a shaft, D, having a series of arms, $d$, which are arranged throughout the length of the shaft in a spiral course, thus practically constituting said shaft a screw-conveyer.

Under the shaft is the grating E, consisting of spaced transverse bars, the whole grating having a lateral concavity or curvature, as shown. It is close enough to the shaft, and its bars are so arranged that the arms $d$ in rotating pass between said bars slightly, and thus prevent its clogging.

On the under surface of the cover $a$ are secured longitudinal parallel spaced bars, F, which lie just beyond the sweep of arms D.

Under the grating E is a horizontal screen, G, which is located above a chute or directing-hopper, H. Under this chute are the crushing-rollers I, one of which is here shown as having a corrugated surface and the other smooth, though both may be smooth or corrugated, as desired, and may have rubber or other elastic faces.

J is a discharge-chute under the rollers.

K is a shaft, upon the end of which is a crank-gear, $k$, to which power is to be applied. This meshes with a pinion, L, on the shaft D, whereby said shaft is rotated.

The ends of the rollers I are provided with intermeshing gears $i$, with one of which the gear $k$ engages, whereby the rollers are driven. One of the rollers is mounted in sliding boxes M, which are influenced by a spring, $m$, so that the gears $i$ are kept in engagement while the rollers themselves preserve an adjustable or yielding impingement. The other end of shaft K may also be provided with a crank, whereby power may be applied to both sides of the machine.

N is a fly-wheel on the end of shaft D.

The operation of the machine is as follows: The grape-bunches are placed in hopper B, and are fed through the opening $b$ at one end thereof. They fall on the grating E; but being unable to pass through they are caught by arms $d$, which tear the stems from them, both against the grating and the bars F on the cover. The stems are carried longitudinally of the machine by the spirally-arranged arms, and are delivered to the chute C, by which they are discharged. The grapes pass through the grating onto the screen, where such of the stems as may have fallen through with the grapes are caught, and thus prevented from following the grapes between the rollers. The grapes are crushed by the rollers, and the juice is discharged in the usual manner.

The projection of arms $d$ through the grating keeps it clear, and also forces the grapes through.

Having thus described my invention, what I claim as new, and desire to secure by Letters Patent, is—

1. In a grape stemmer and crusher, a rotating shaft provided with a spirally-arranged series of arms adapted to tear the stems from the grapes and convey them to their discharge, substantially as herein described.

2. In a grape stemmer and crusher, a spirally-arranged series of arms on a rotating shaft, in combination with a grating under the arms, substantially as herein described.

3. In a grape stemmer and crusher, the rotating shaft D, having the arms d arranged spirally throughout its length, in combination with the laterally-concaved grating E under the shaft, and having parallel spaced bars between which the arms d pass, substantially as herein described.

4. In a grape stemmer and crusher, the casing or shell A, having a semi-cylindrical hinged cover, a, provided with longitudinal parallel and spaced bars F on its under surface, in combination with the rotating shaft D within the casing, and having arms d arranged spirally upon said shaft, substantially as herein described.

5. In a grape stemmer and crusher, the casing or shell A, the laterally-concaved grating E, and the semi-cylindrical or curved cover a, having longitudinal bars F on its under surface, in combination with the rotating shaft D, mounted longitudinally in the casing between the grating and cover, and having the spirally-arranged arms d, substantially as herein described.

6. In a grape stemmer and crusher, the casing or shell A, the hopper B on its front, having a feed-aperture, b, near one end communicating with the casing, and the laterally-concaved grating E in the casing, in combination with the rotating shaft D, having the spirally-arranged arms d, substantially as herein described.

7. In a grape stemmer and crusher, the casing or shell A, having a discharge-chute, C, at one end, and a cover, a, provided with an extension, a', and adapted to fit down upon the casing and chute, and the hopper B, having a feed-aperture, b, at the end opposite the discharge-chute, in combination with the grating E and the rotating shaft D, having the spirally-arranged series of arms d, substantially as herein described.

8. In a grape stemmer and crusher, the combination of the rotating shaft D, having arms d, the horizontal screen G, and the intervening concave grating E, substantially as herein described.

9. In a grape stemmer and crusher, the combination of the rotating shaft D, having the spirally-arranged series of arms d, the concaved grating E under the shaft, the directing-chute H under the grating, and the rotating crushing-rollers I under the chute, substantially as herein described.

10. In a grape stemmer and crusher, the combination of the rotating shaft D, having the spirally-arranged series of arms d, the concaved grating E under the shaft, the horizontal screen G under the grating, the directing-chute H under the screen, and the rotating crushing-rollers I under the chute, substantially as herein described.

11. A grape stemmer and crusher comprising the shell or casing A, having an end chute, C, for the stems, and a cover, a, with longitudinal bars F on its under surface, the hopper B, having a feed-aperture at the end opposite the discharge-chute, the grating E in the casing, the rotating shaft D, having the spirally-arranged series of arms d, adapted to pass between the bars of the grate and to tear the stems from the grapes and convey them to the discharge-chute, the horizontal screen G under the grating, the directing-chute H under the screen, the rotating crushing-rollers I under the chute, and the discharge-chute J, all arranged and adapted to operate substantially as herein described.

In witness whereof I have hereunto set my hand.

AUGUSTE DAVID.

Witnesses:
S. H. NOURSE,
C. D. COLE.